F. B. BATCHELDER,

Assignor to THE BATCHELDER MACHINE COMPANY.

LEATHER FINISHING MACHINE.

No. 9,794. Reissued July 12, 1881.

Witnesses

L. F. Connor.

Bernice J. Noyes.

Inventor.

Fred B. Batchelder.

by Crosby & Gregory Attys.

UNITED STATES PATENT OFFICE.

FRED B. BATCHELDER, OF EAST BOSTON, MASSACHUSETTS, ASSIGNOR TO THE BATCHELDER MACHINE COMPANY, OF PORTLAND, MAINE.

LEATHER-FINISHING MACHINE.

SPECIFICATION forming part of Reissued Letters Patent No. 9,794, dated July 12, 1881.

Original No. 227,204, dated May 4, 1880. Application for reissue filed June 7, 1881.

*To all whom it may concern:*

Be it known that I, FRED B. BATCHELDER, East Boston, in the county of Suffolk and State of Massachusetts, have invented a new Improvement in Leather-Finishing Machines, of which the following is a specification.

Figure 1:
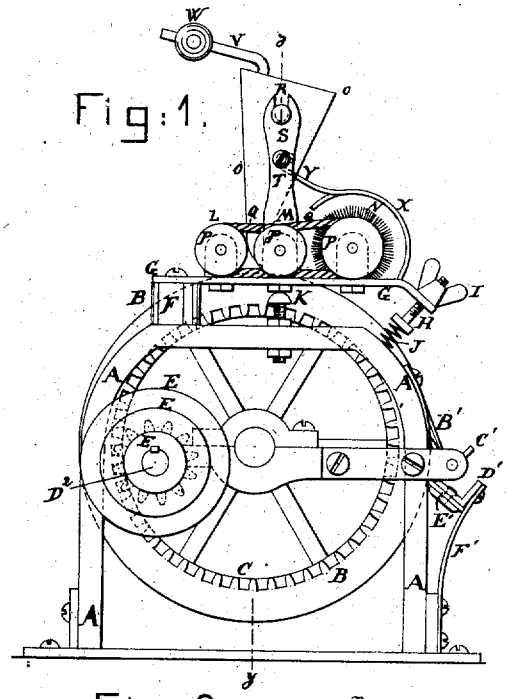
Figure 3:
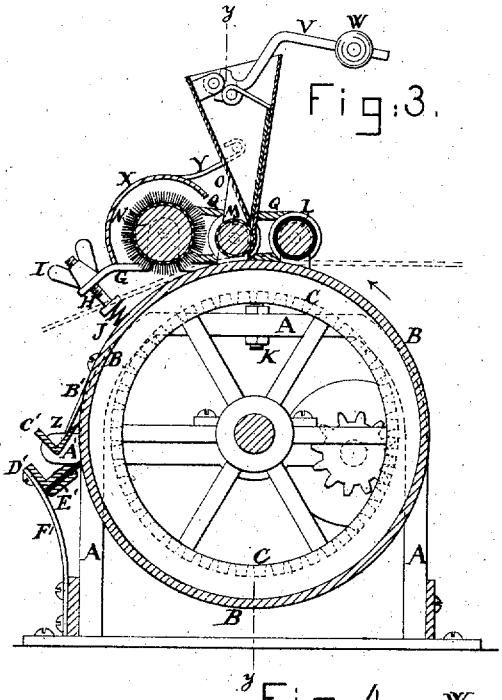
Figure 2:
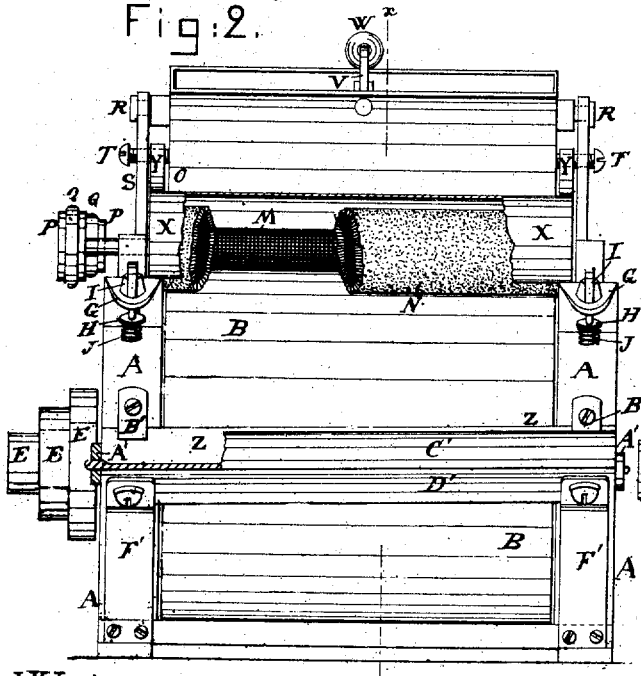
Figure 4:
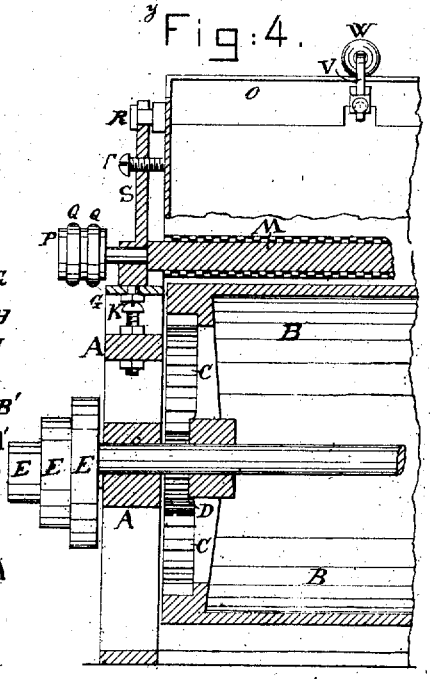

Figure 1 is an end elevation of the machine. Fig. 2 is a front elevation of the machine, part being broken away. Fig. 3 is a sectional end elevation taken through the line *x x*, Fig. 2; and Fig. 4 is a sectional side elevation of part of the machine, taken through the line *y y*, Figs. 1 and 3.

Similar letters of reference indicate corresponding parts.

The object of this invention is to furnish machines for applying blacking, paste, blood, stains, or other mixture or dressing to surfaces of leather and other materials in such a way that the opposite surfaces may be kept practically clean.

The invention consists in the combination, with the cylinder, of devices for cleaning it, and also in the combination, with the frame and the roller and brushes, of devices for regulating the pressure of the roller and brushes against the cylinder, as will be hereinafter fully described.

A represents the frame-work of the machine, provided with suitable bearings or boxes to receive the journals of a rotating cylinder or supporting-surface, B. The cylinder B has at one end a spur-gear, C, with which meshes the pinion D on the main driven shaft $D^2$, provided with a cone-pulley, E, which receives the driving-belt and enables the cylinder to be driven at the proper speed, as may be required. The studs F of the frame A have secured to them springs G, which at their outward ends receive bolts H, provided with nuts I, the said bolts being connected at their lower ends with springs J, secured to the frame. The springs G have bearings which receive the journals of the roller L, the blacking or dressing applying brush or roller M, and the brush N, arranged parallel with each other. The feeding-roller L is covered with rubber or other suitable material, is revolved by friction from the cylinder B, and is designed in connection with cylinder B to assist in feeding the leather through the machine. The brush M is covered with felt, sponge, or other suitable material, and is designed to receive the blacking or other mixture from the hopper O and apply it to the leather. (Shown in dotted lines, Fig. 3.) The brush N is designed to spread the mixture upon the leather, and is formed of bristles or other suitable material, as the kind of mixture to be applied to the leather may require. The brushes M N are driven from the roller L by pulleys and belts or friction gear-wheels, as may be desired. In the drawings they are shown as being driven by pulleys P and belts Q. By attaching the bearings for the roller L and brushes M N to the springs G, the said roller and brushes will be held down upon the leather passing through the machine in such a way as to exert a yielding pressure, and thus accommodate themselves to the varying thickness of the leather. This construction also allows the roller L and brushes M N to be adjusted by the nuts I.

The tension of the springs G may also be further regulated by the stop-screws K, screwed into the top bars of the frame A beneath the middle parts of the said springs, the screws being turned up and down to limit the movement of springs.

The hopper O, made wedge-shaped, has gudgeons R, which rest in notches in the upper ends of the standards S. The hopper O is secured in place by set-screws T, which pass in through the standards S and rest against the ends of the said hopper. The lower part of the hopper passes down at the side of the brush M, and has a narrow slit between the lower edges of its sides, through which the dressing-mixture escapes to the brush M. The lower edge of the side of the hopper O farthest from the brush M is extended and bent inward beneath the said brush M, so that the said brush M may remove the mixture from the said projecting edge and apply it to the leather. The discharge-opening in the bottom of the hopper O is regulated in size, and is closed, when desired, by a gate, U, which slides up and down upon the inner surface of one of the sides of the said hopper.

To the upper edge of the gate U, or to lugs formed upon or attached to the said edge, is pivoted a lever, V, the inner end of which is pivoted to a side of the hopper O. The lever V is curved upward and outward, and is provided with a sliding weight, W, which may be adjusted to hold the gate U in any desired position.

X is a semi-cylindrical cap, which is placed over the brush N, to prevent the spattering of the mixture by the said brush N. The cap X is provided at its ends with hook-arms Y, which are hooked upon the set-screws T.

The sides or pieces of leather are all of an irregular and different form, and consequently the portion of the cylinder or supporting surface B not directly covered by the side or leather being blacked or dressed by the brush will be coated or covered by the said brush with blacking or dressing, which, unless removed, would soil or stain the under side of the next piece of leather passed through the machine. The blacking, dressing, or other mixture so applied to the cylinder B is partially removed by the knife or scraper Z, the ends of which are pivoted to arms A′ attached to the frame A. The knife Z is pressed against the side of the cylinder B by two springs, B′, which are pivoted to the frame A, so that they can be turned outward to release the knife Z and allow it to be turned upon its pivots for convenience in cleaning it.

Along the rear edge of the knife Z is formed, or to it is attached, a trough or channel, C′, to receive the mixture scraped from the cylinder B. In the bottom of the trough C′, near one end, is formed an aperture, through which the collected mixture escapes into the trough D′, placed beneath the said trough C′. The mixture from the lower trough, D, runs into a pail or other receiver.

The blacking or dressing left on the cylinder after passing the knife Z is entirely removed by the wiper or cleaner E′, of india-rubber, leather, or other suitable material, the wiper leaving the surface of the cylinder B practically clean. This wiper E′ is connected with the inner side of a trough, D′. The trough D′ is attached to the upper ends of two springs, F′, by which it is pressed against the cylinder B. The lower ends of the springs F′ are attached to the frame A.

With this construction a different roller, brushes, and hopper may be used for each different mixture to be applied to the leather, and by applying two or more sets of brushes to a single cylinder two or more mixtures may be applied successively to the leather while passing once through the machine.

Instead of the cylinder B, I might use an endless table.

The hopper O constitutes a receptacle for the blacking or dressing.

I claim—

1. In a machine for blacking or dressing leather hides or skins, a rotating supporting-surface for the hide or skin and blacking or dressing applying brush or roller to apply blacking or dressing to one side of the hide or skin, the said surface having co-operating therewith a wiper or cleaner to clean the said rotating support, substantially as and for the purpose described.

2. In a machine for blacking or dressing leather hides or skins, a blacking or dressing applying brush or roller and rotating supporting-surface for leather, combined with the spatter-guard and with a wiper or cleaner, to operate substantially as described.

3. In a leather-finishing machine, the combination, with cylinder B, of a knife or scraper, Z, and trough or channel C′, having an outlet at one end, substantially as herein shown and described, so that any mixture or other substance adhering to the surface of the said cylinder may be removed therefrom, as set forth.

4. In a leather-finishing machine, the combination, with the cylinder B and the knife Z, of the trough D′, provided with a wiping-plate, E′, of leather, rubber, or other suitable material, substantially as herein shown and described, to wipe off and receive any substances that may escape the knife Z, as set forth.

5. In a leather-finishing machine, the rotating cylinder or supporting surface, combined with the roller L and brush or roller M, and wiper or cleaner, to operate substantially as and for the purpose set forth.

6. In a leather-finishing machine, the combination, with roller L, brushes M N, and cylinder B, of the springs G, substantially as herein shown and described, so that the roller and brushes L M N will have a yielding pressure against the leather on cylinder B, as set forth.

7. In a leather-finishing machine, the combination, with cylinder B, roller L, brushes M N, and springs G, of the screws, nuts, and springs H I J, substantially as herein shown and described, so that the pressure of the springs G may be regulated as required.

8. In a leather-finishing machine, the combination, with the hopper O and its gate U, of the lever V, provided with an adjustable weight, W, substantially as herein shown and described, so that the escape of the mixture may be regulated and prevented as required.

9. A leather-finishing machine formed by the combination of the cylinder B, the roller and brushes L M N, the hopper O, and cleaning devices Z C′ and E′ D′, substantially as herein shown and described.

FRED B. BATCHELDER.

Witnesses:

G. W. GREGORY,

L. F. CONNOR.